United States Patent Office 3,554,674
Patented Jan. 12, 1971

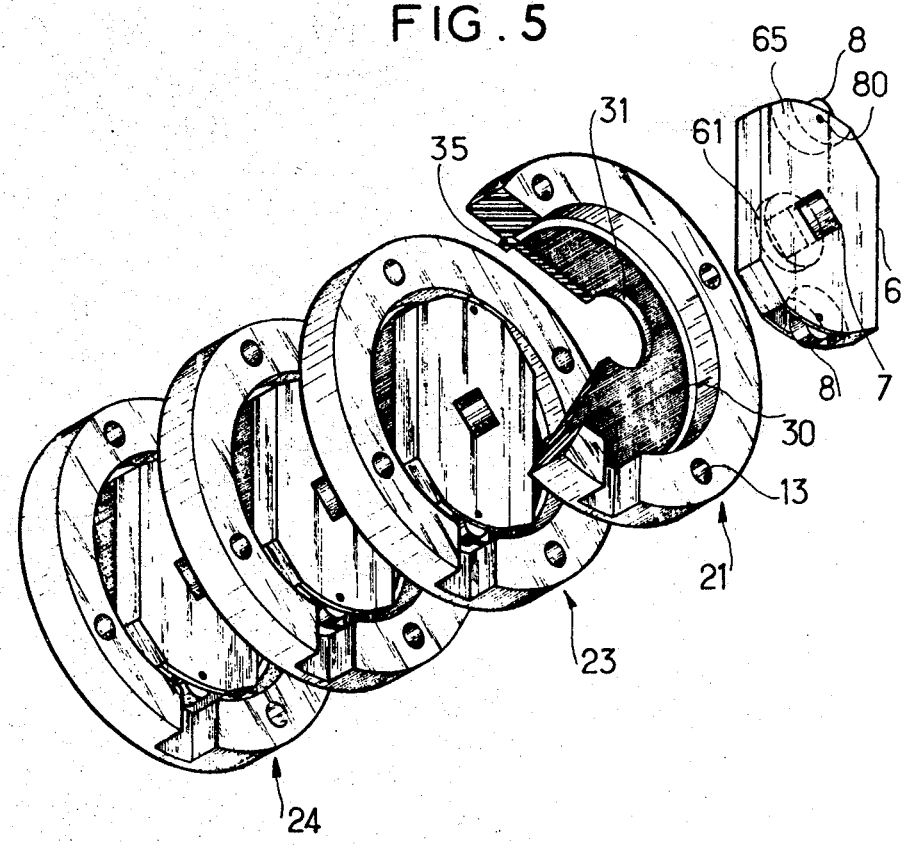

3,554,674
MICROPUMP FOR THE DOSAGING OF LIQUID, AND CONTAINER-FILLING LINE FOR SAME
Jacques Huret, Sainte-Genevieve-des-Bois, France, assignor to Compagnie Generale d'Automatisme, Paris, France, a corporation of France
Filed Jan. 23, 1969, Ser. No. 793,314
Claims priority, application France, Jan. 24, 1968, 137,318
Int. Cl. F04b 43/12
U.S. Cl. 417—475　　　　　　　　　4 Claims

ABSTRACT OF THE DISCLOSURE

A micropump assembly of the peristaltic type for the dosing of liquid, comprising at least one rotatable small plate or arm carrying a roller and compressing a tube of elastic material arranged in a loop in a recess of the face of an aperture formed in a plate. The plate comprises hubs for connecting with the plate of another micropump to constitute a group of associated pumps which are aligned axially and whose arms or small plates are driven by one and the same shaft.

BACKGROUND OF THE INVENTION

Field of the invention

The present invention relates to the dosage of liquid products and distribution of predetermined doses of one or more liquid products into respective containers and is applicable particularly but not in any limiting sense to the field of chemical, biological or biochemical analysis.

This invention further relates to a micropump of the peristaltic type adapted for the dosaging of liquids which forms a part of a dosaging and dispensing assembly of a filling line and to the filling line thus constituted.

SUMMARY OF THE INVENTION

The peristlatic pump according to the invention comprises at least one rotary arm carrying a roller compressing an elastic tube arranged in a loop within a recess of a plate. This plate is connected to the plate of another pump to constitute a group of pumps which are aligned axially and whose arms are driven by one and the same shaft.

The filling line according to the invention comprises a group of pumps as defined hereinbefore, each of the pumps having an inlet pipe connected to a reservoir adapted to contain a dosage of liquid or a liquid cleaning product, the outlet pipes of the group of pumps being aligned above a conveying line carrying containers to be filled.

According to one feature of the invention, the conveying line is formed by a web driven by a step by step advancing device, carrying a plurality of reservoirs, cells, compartments or similar containers passing opposite the ends of the said outlet pipes.

BRIEF DESCRIPTION OF THE DRAWINGS

FIG. 5 is an exploded perspective view of the installation according to FIG. 4.

DESCRIPTION OF THE PREFERRED EMBODIMENT

Figure 1:
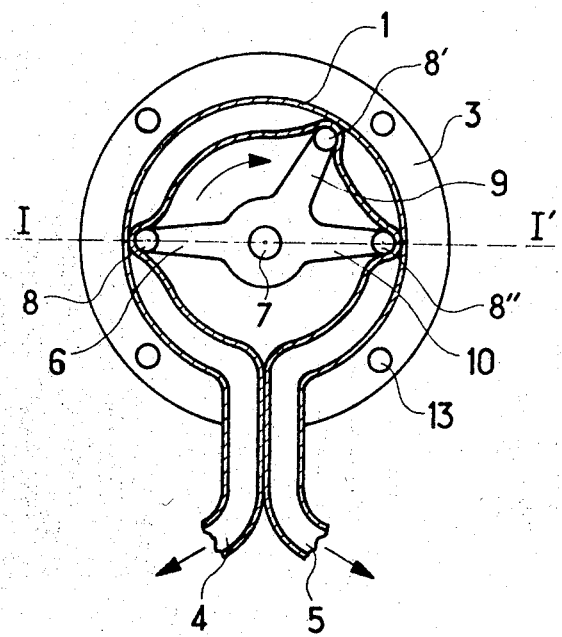
FIG. 1 is a cross-sectional view of a micropump according to the invention.

A micropump according to the invention comprises a flexible tube 1 arranged either directly along the sides of the face of a recess or a circular aperture formed in a plate 3, or in a groove 2 formed in the face of the lateral walls of the aforesaid recess. The tube 1 forms a loop whose ends 4 and 5 constitute respectively, the inlet pipe (suction) and the outlet pipe (delivery) of the pump.

The plate 3 can be made of metal or any rigid synthetic material, whereas the tube 1 is flexible and made of natural or synthetic rubber or any elastic and flexible synthetic material, impervious to the products to be pumped and resistant to the chemical action of these products.

According to a first embodiment, the micropump comprises at least one arm such as 6 fixed to a rotating shaft 7 arranged along the axis of the loop formed by the flexible tube. The shaft 7 can be of circular section as shown or rectangular or square, and is driven in rotational movement by any mechanical device (not shown in FIG. 1) which may be a direct current electric motor, an asynchronous motor or a step-by-step motor. The arm 6 carries at its end a roller or the like 8 mounted preferably on a shaft, adapted to be displaced radially, and possibly provided with a restoring device permitting the roller 8 to exert a pressure on the tube 1 sufficiently great to compress this tube so as to close the internal tube cross-section.

As shown in FIG. 1, the micropump may comprise a plurality of arms such as 9 and 10 similar to the arm 6 and each provided with rollers 8', 8" similar to the roller 8. These arms may be distributed angularly in any desired manner in accordance with the desired characteristics of the delivery of the micropump. It will be apparent that the micropump may comprise two diametrically opposite arms or more than two arms, and that the latter may be given any shape.

Figure 2:
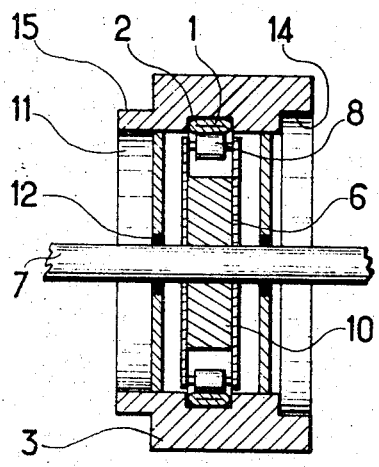
FIGS. 2 and 3 are axial, sectional views of a micropump according to the invention.

FIG. 2 shows an axial sectional view taken on the line I–I' of the micropump shown in FIG. 1. In FIG. 2, the tube 1, which may be of rectangular or rounded form in accordance with the characteristics of the tube, is arranged in the groove 2 formed in the face of the recess in the plate 3, and the arm or arms can be arranged on a hub. The arms may also be replaced by a wheel formed in one piece or a plurality of associated discs comprising axial slots and grooves receiving the roller 8, and the device for returning the roller if necessary.

By way of example, this returning device may comprise springs acting on the shaft of the roller 8 directly or by means of a stirrup, shoe or the like. The arms carrying the rollers may be fast with the shaft 7 or simply comprise a means permitting them to be driven in rotation by the shaft.

The rotor of the micropump may also comprise means for regulating or varying the respective angular positions of the rollers or arms.

In the case where a plate supports the rollers, holding the plate in the plane of the tube 1 may be effected by guiding it between two walls such as 11. The walls such as 11 may comprise a bearing 12 in which the shaft 7 rests. It is also possible to form a groove 2 having a depth and cross-section permitting the guiding of the rollers, thus dispensing with the need for bearings.

The micropump according to the invention operates as follows: when the arm or plate 6 turns in the direction indicated by the arrow in FIG. 1, the liquid contained in the volume defined by the internal surface of the tube between the portions compressed by the rollers 8 and 8' is displaced in the same sense. The same happens as regards the liquid contained in the portion of tube defined by the rollers 8' and 8''; the liquid existing in the "inlet" portion 4 of the tube is inspired while the liquid contained in the "outlet" portion 5 of the tube is expelled. When the pump rotor rotates, the volume of liquid delivered by the pump is in accordance with the length and caliber of the tube and the number and size of the rollers such as 8.

However, the delivery of the pump is not constant but intermittent and the pump successively delivers quantities of liquid in accordance with the respective angular spacing of the rollers. Supposing, for example, that the rollers are distributed uniformly, a series of equal quantities of liquid is delivered. As will be seen hereinafter, the present invention makes use of this property to dosage liquid.

The micropump according to the invention further comprises a means for grouping two or more micropumps to obtain a dosaging group driven by a single shaft.

According to a first form of embodiment illustrated in FIG. 1, the plate 3 comprises perforations such as 13 permitting a plurality of pumps to be assembled together by means of screws or rods.

Figure 3:
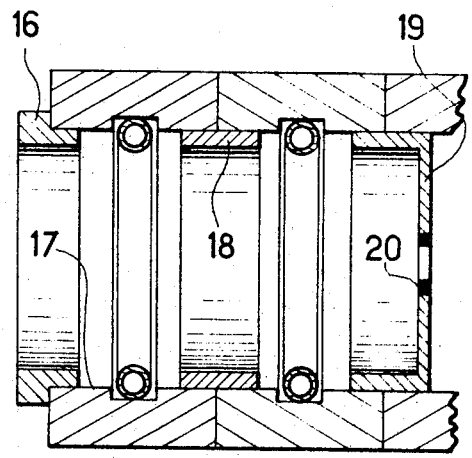

According to a form of embodiment illustrated in FIG. 2, a channel 14 is formed in the face or in the internal surface of the opening formed in the plate 3. This channel is intended to receive a corresponding male portion of another micropump. This male portion may be formed either by milling from the lateral external surface of the plate 3 of a channel 15, or at the casting of the plate 3. This male portion may be constituted by a sleeve such as those shown at 16 and 18 in FIG. 3, fitted into the internal surface of the opening 17 of the plate 3. The sleeve may be closed by a transverse wall 19 which may comprise a bearing 20 supporting the common shaft of the grouped pumps.

The group of micropumps thus constituted may carry only two bearings arranged at each end of the group, the rotors being fixed on the shaft or provided with individual guiding devices.

Figure 4:
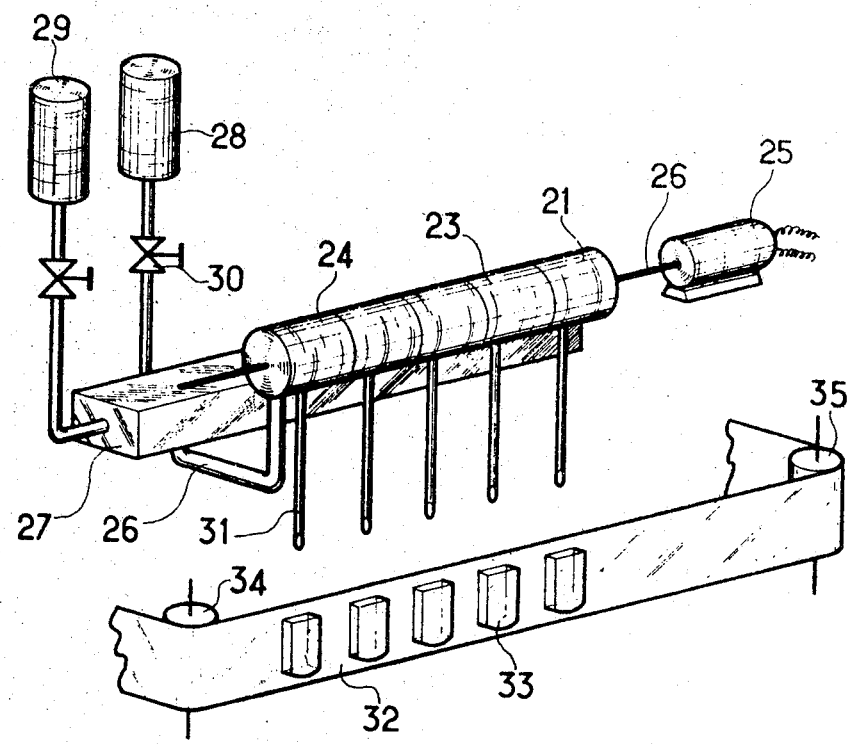
FIG. 4 is a perspective view of an installation for dosaging or dispensing liquid according to the invention.

FIG. 4 shows in perspective a device for dosing and dispensing liquid according to the invention.

This device comprises a group of micropumps 21, 23 . . . 24 associated with one another and driven by a motor 25 by means of a single shaft 26. According to one embodiment, the inlet pipes of the micropumps (only one inlet pipe has been shown at 26) are connected to a common reservoir which is for example in the form of a tank 27 preferably closed by a cover. Associated with the tank 27 is a reservoir 28 containing liquid to be dosaged and, where appropriate, a reservoir containg cleaning liquid 29 is connected to the tank 27 by pipes comprising valves such as that represented diagrammatically at 30.

The outlet pipes of the micropumps are aligned in the path of a series of containers which can be moved in translational movement by means of a conveyor advancing in a step-by-step manner. This conveyor may be of any type, for example a horizontal type, and the containers may also be of any desired type.

FIG. 5 shows a sectional view in partly exploded and skeleton form of a preferred form of the group of micropumps 21, 23 . . . 24 identical to that of FIG. 4. For each micropump, the plate 3 has been shown as provided with a cylindrical recess 30 having a central circular aperture 31. The tube 1 (not shown) is lodged against the annular side wall of the recess 30 and is compressed against the annular side wall of recess 30 by two diametrically opposed rollers 8, each arranged in a groove 65 formed in the arm 6 and adapted to rotate about pins 80 fixed to the arm 6. The arm 6 is unitary, provided at its central portion with a square aperture 7 the edges of which form at one of the faces a circular projection 61 which engages in the aperture 31.

The micropumps each comprise, at the face opposite to recess 30, an annular flange 35, the diameter of which is substantially equal to that of the recess 30 but slightly smaller than that of recess 30 so as to engage in the recess of a neighboring pump element 23, FIG. 5, between the arm 6 and the face of the recess 30. The elements 21, 23 . . . 24 are fixedly coupled to one another by screws or the like engaged in the perforations 13. The driving shaft fixed to a motor is then introduced into the apertures such as 7 mentioned hereinbefore.

According to one embodiment of the invention, concerning more particularly the case where the apparatus is used for the dosaging of chemical or biological products in an analysis or treatment line, the conveyor is constituted by a film or web arranged in a horizontal or vertical plane, provided with compartments including an aperture at their upper portions, this aperture passing opposite the end of the pipes 31.

In FIG. 4 there has been shown a preferred embodiment comprising a film 32 provided with compartments 33 arranged in a vertical plane and driven by a system represented diagrammatically by rollers 34 and 35.

In cases where there is a single tank 27, the starting of the motor 25 which rotates through a predetermined angle, produces the transfer of a specific quantity of liquid into each of the compartments 33 arranged opposite the pipes 31. Then the system 34–35 advances the film so as to bring a new series of compartments opposite the pipes 31, and the operation is recommenced.

To change the liquid, the tank is emptied and then a quantity of cleaning liquid (which may be a sterilizing liquid such as formaldehyde in the case of treating bacteriological cultures) is introduced into the tank and the group of pumps is started to effect the washing of the pump and the pipes and the emptying of the tank.

By using a plurality of reservoirs filled with different liquids instead of a single tank, it is also possible to carry out dosaged mixing of these products.

What is claimed is:

1. A peristaltic pump including at least one pump element comprising, a block having a substantially cylindrical recess therein, a first face perpendicular to the central axes of said recess, and substantially closing one end of said recess, a resilient and flexible tube arranged with a loop lying against the annular side wall of said recess, a single passage in said annular side wall through which said tube enters and leaves said recess, a rotor mounted in said recess and rotatable about an axis coaxial with that of said recess, at least one bearer element mounted on said rotor and adapted to compress a portion of said tube against said annular side wall, a second face opposite to and parallel to said first face and an annular projection from said second face whose external diameter is slightly less than the internal diameter of said recess whereby said second face may be centered within a corresponding recess carried by a second block identical to said first block, thereby allowing a plurality of peristaltic pump units to be fabricated from identical blocks.

2. A peristaltic pump assembly according to claim 1 wherein said first face of said first block has a circular aperture coaxial with the axis of said recess and said rotor has a circular flange having an outer diameter slightly less than the inner diameter of said circular aperture whereby said rotor is supported within said aperture.

3. A peristaltic pump assembly according to claim 1 wherein said rotor has two diametrically opposed bearer elements each formed by a roller mounted on the periphery of said rotor and rotatable about an axis parallel to the axes of said rotor.

4. A peristaltic pump according to claim 3 wherein said rotor has a groove in its peripheral surface for receiving each roller, each roller being brushly engaged in the corresponding groove and the axis of each roller being fixed in said groove.

References Cited

UNITED STATES PATENTS

| | | | |
|---|---|---|---|
| 315,667 | 4/1885 | Serdinko | 103—149 |
| 669,458 | 3/1901 | Fisher et al. | 230—158 |
| 796,724 | 8/1905 | Hewitt | 103—126(H) |
| 2,428,619 | 10/1947 | Douglas | 103—149 |
| 2,709,538 | 5/1955 | Harrington | 141—129 |
| 2,757,844 | 8/1956 | Greissman | 141—191 |
| 2,893,356 | 7/1959 | Murray | 103—149 |
| 2,913,992 | 11/1959 | Blue et al. | 103—149 |
| 2,946,291 | 7/1960 | Roebig | 103—149 |
| 3,431,864 | 3/1969 | Jones, Jr. | 103—149 |

CARLTON R. CROYLE, Primary Examiner

W. J. GOODLIN, Assistant Examiner

U.S. Cl. X.R.

141—129